Feb. 17, 1931.  J. R. TOWNE  1,793,198
MOVING PICTURE REEL
Filed March 3, 1928

WITNESSES

INVENTOR

Patented Feb. 17, 1931

1,793,198

UNITED STATES PATENT OFFICE

JUDSON R. TOWNE, OF MINNEAPOLIS, MINNESOTA

MOVING-PICTURE REEL

Application filed March 3, 1928. Serial No. 258,953.

This invention relates to a reel or spool on which a flexible strip is wound, such as a reel or spool for a motion picture film. In exhibiting the films and in rewinding the same they are wound on reels or spools and the end of the film is engaged in some kind of holding means on the hub of the reel or spool so that the film can be started on the empty reel or spool.

The reel or spool comprises a central hub portion and side portions usually of thin metal of considerable diameter so that the hub portion is not easily reached by the hand, particularly since the spool is quite narrow. While various holding means have been proposed for holding the end of the film on the hub, it has been somewhat difficult and a somewhat slow operation to so secure the end of the film.

It is an object of this invention, therefore, to provide a simple and efficient holding means for holding the end of the film on the reel and one with which the film can be very easily and quickly engaged.

It is a further object of the invention to provide a motion picture film reel having a hub and means for holding the end of the film thereon, which means is accessible from the side of the reel.

It is still another object of the invention to provide a reel for a motion picture film having a hub and means for holding the end of the film thereon, said reel having an opening in the side thereof adjacent said means and said means being accessible at the side of the reel whereby the film can be moved sidewise at said opening and into position to be held by said means.

It is more specifically an object of the invention to provide a motion picture film reel having a side portion with spaced arms or spokes, one of which is free at its end adjacent the hub and has said end bent inwardly to resiliently engage said hub and hold the end of the film thereagainst, said reel preferably having a comparatively wide opening adjacent said arm.

These and other objects and advantages of the invention will be fully set forth in the following description made in connection with the accompanying drawings, in which like reference characters refer to similar parts throughout the several views, and in which:—

Figure 1:
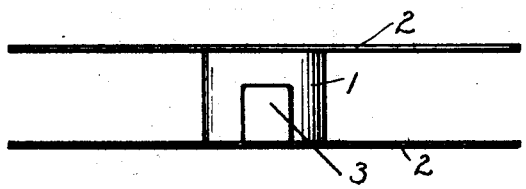
Fig. 1 is an edge view of a reel having the invention applied thereto.

Referring to the drawings, a reel for a motion picture film is shown comprising a central cylindrical hub portion 1 and side flanges or plates 2 secured thereto. In the type of reel illustrated, the side plates are shown as having an outer annular portion 2a and an inner circular portion 2b connected by spaced radial arms 2c. The hub 1 and side plates 2 have the usual passage 1a extending centrally therethrough for supporting the reel on the machine with which it is operated.

Figure 2:
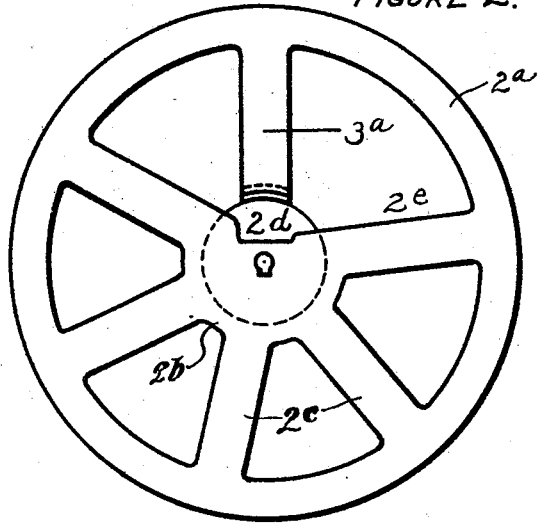
Fig. 2 is a view in side elevation of said reel.
Figure 3:
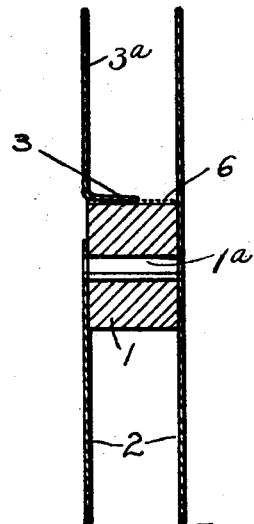
Fig. 3 is a section taken on line 2—2 of Figure 2 as indicated by the arrows.

In accordance with the present invention, a holding means 3 is shown for holding the end of a film 6 against the hub 1, and while this holding means might be variously formed, in the embodiment of the invention illustrated it is formed by bending inwardly substantially parallel with the hub 1 one end of one of the radial arms of the reel, this particular arm being designated 3a. The portion 3 is preferably rounded as shown in Fig. 2 so as to fit the surface of hub 1. It will also be noted that the portion 2b of the side 2 in which arm 3a is disposed is cut away as shown at 2d and there is an extra wide opening 2e between arm 3a and the adjacent arm 2c at the right thereof as shown in Fig. 2.

In operation when one end of a film is to be started on the reel the operator will hold the loose end and will pass the same between the sides 2 and out at one side through opening 2e. He then slips the end of the film lengthwise of the hub, or in other words, parallel to the axis of the hub and reel under the holder 3. The film is thus passed edgewise radially of the reel or toward the side thereof and as stated, passes under holder 3 and is held between the same and hub 1.

The film can now be wound several turns, as usual, by turning the reel and the reel is then in condition to be placed in the machine either for exhibiting or rewinding. The end of the film can thus be quickly and easily inserted in the holding means to start the winding. The holding means is exposed at one side of the reel and at one end of the hub where it is an easy matter to slip the film thereunder. The arm 3a is made of material which is resilient and the angle at which portion 3 is bent relative to arm 3a can be varied slightly to give more or less tension against the peripheral surface of hub 1. The end of the film can thus be held with the desired tension.

From the above description it is seen that applicant has provided an extremely simple and efficient holding means for a film reel or spool and one which can be easily and quickly operated. The reel comprising said means can be easily and inexpensively made and the same will be efficient and durable. The device has been amply demonstrated in actual practice and found to be very successful and efficient.

It will, of course, be understood that various changes may be made in the form, details, proportions and arrangement of the parts, without departing from the scope of applicant's invention, which, generally stated consists in a device capable of carrying out the objects above set forth in the novel parts and combinations of parts disclosed and defined in the appended claims.

I claim:

1. A reel for a flexible strip having a central hub and side portions, a resilient member pressing against said hub and adapted to clamp a strip thereagainst, one of the side portions of said reel having an opening exposing the end of said hub and said holding means, said holding means forming with said hub a slot having an open end adjacent said opening, whereby the end of said strip can be inserted sidewise from said side portion under said holding means.

2. A reel for a flexible strip comprising a hub and side plates said side plates having an outer annular portion, central portions at the ends of said hub and spaced radial arms connecting said portions, one of said side plates having an arm extending to said hub and having its end bent inwardly to resiliently engage said hub and form a holding means for the end of said strip, whereby the end of said strip may be passed between said plates outwardly between the arms and the end thereof moved inwardly laterally between said bent end of said arm and said hub.

3. A reel for a flexible strip comprising a hub and side plates, one of said side plates having a member carried thereby having a portion bent to resiliently lie against said hub and form a strip holding means, said side having an opening at one side of said member and exposing the end of said hub and said bent portion of said member whereby a strip may be inserted sidewise under said bent portion.

4. A reel for receiving a flexible strip comprising a cylindrical hub on which said strip is wound, side plates at the ends of said hub of much greater diameter than said hub, a strip holding means cooperating with said hub and constructed and arranged to have the strip inserted edgewise therein from one side and an opening in one of said side plates at said side of said strip holding means whereby the end of the strip can be passed between said side plates, through said opening and then slipped edgewise into said holding means from the side of the reel having the opening therein.

JUDSON R. TOWNE.